US008538896B2

(12) United States Patent
Mensink et al.

(10) Patent No.: US 8,538,896 B2
(45) Date of Patent: Sep. 17, 2013

(54) RETRIEVAL SYSTEMS AND METHODS EMPLOYING PROBABILISTIC CROSS-MEDIA RELEVANCE FEEDBACK

(75) Inventors: Thomas Mensink, Grenoble (FR); Jakob Verbeek, Grenoble (FR); Gabriela Csurka, Crolles (FR)

(73) Assignee: Xerox Corporation, Norwalk, CT (US)

( * ) Notice: Subject to any disclaimer, the term of this patent is extended or adjusted under 35 U.S.C. 154(b) by 266 days.

(21) Appl. No.: 12/872,105

(22) Filed: Aug. 31, 2010

(65) Prior Publication Data

US 2012/0054130 A1 Mar. 1, 2012

(51) Int. Cl.
*G06F 15/18* (2006.01)
(52) U.S. Cl.
USPC .......................................................... 706/12
(58) Field of Classification Search
USPC .......................................................... 706/12
See application file for complete search history.

(56) References Cited

U.S. PATENT DOCUMENTS

| | | | |
|---|---|---|---|
| 6,119,114 A * | 9/2000 | Smadja ................................. | 1/1 |
| 6,675,159 B1 * | 1/2004 | Lin et al. ............................... | 1/1 |
| 7,099,860 B1 * | 8/2006 | Liu et al. ............................... | 1/1 |
| 7,242,810 B2 | 7/2007 | Chang | |
| 7,349,895 B2 | 3/2008 | Liu et al. | |
| 7,394,947 B2 | 7/2008 | Li et al. | |
| 7,680,341 B2 | 3/2010 | Perronnin | |
| 2004/0002677 A1 | 1/2004 | Gentsler | |
| 2005/0050086 A1 | 3/2005 | Liu et al. | |
| 2006/0181722 A1 * | 8/2006 | Edge ............................. | 358/1.9 |
| 2006/0239591 A1 | 10/2006 | Kim et al. | |
| 2008/0010275 A1 | 1/2008 | Lee et al. | |
| 2008/0250011 A1 | 10/2008 | Haubold et al. | |
| 2009/0076800 A1 | 3/2009 | Li et al. | |
| 2009/0265165 A1 | 10/2009 | Apelqvist et al. | |
| 2010/0070521 A1 | 3/2010 | Clinchant et al. | |
| 2010/0082615 A1 * | 4/2010 | Clinchant et al. ............. | 707/728 |

OTHER PUBLICATIONS

Ordinal Regression Based Model for Personalized Information Retrieval Mohamed Farah Riadi-Gdl, Facult'e des Sciences de Monastir, Tunisia mohamed.farah@riadi.rnu.tn.*
Query-Adaptive Fusion for Multimodal Search Search systems need to have the flexibility to adapt to each query so a search strategy that is likely to provide the most useful retrieval results can be employed. By Lyndon Kennedy, Student Member IEEE, Shih-Fu Chang, Fellow IEEE, and Apostol Natsev.*
Improving nearest neighbor rule with a simple adaptive distance measure Jigang Wang, Predrag Neskovic, Leon N. Cooper, Department of Physics, The Institute for Brain and Neural Systems, Brown University, P.O. Box 1843, Providence, RI 02912, USA Received Mar. 8, 2006 Available online Aug. 24, 2006 Communicated by R.P.W. Duin.*

(Continued)

*Primary Examiner* — Kakali Chaki
*Assistant Examiner* — Ababacar Seck
(74) *Attorney, Agent, or Firm* — Fay Sharpe LLP

(57) ABSTRACT

In a retrieval application, a document relevance scoring function comprises a weighted combination of scoring components including at least one of a pseudo-relevance scoring component and a cross-media relevance scoring component. Weights of the document relevance scoring function are optimized to generate a trained document relevance scoring function. The optimizing is respective to a set of training documents including at least some multimedia training documents and a set of training queries and corresponding training document relevance annotations. A retrieval operation is performed for an input query respective to a database using the trained document relevance scoring function to retrieve one or more documents from the database.

22 Claims, 3 Drawing Sheets

(56) References Cited

OTHER PUBLICATIONS

Probabilistic Models for Combining Diverse Knowledge Sources in Multimedia Retrieval Rong Yan, CMU-LTI-06-008 Language Technologies Institute School of Computer Science Carnegie Mellon University 5000 Forbes Ave, Pittsburgh, PA, 15213 www.lti.cs.cmu.edu.*

J. Ah-Pine et al., "XRCE's Participation to ImageCLEF 2008," In Working Notes of the 2008 CLEF Workshop (2008).

K. Barnard et al., "Matching Words and Pictures," Journal of Machine Learning Research 3(6):1107-1135, Aug. 2003.

S. Clinchant et al., "XRCE's Participation to Image CLEFphoto 2007," In Working Notes of the 2007 CLEF Workshop (2007).

N. Maillot et al., "IPAL Inter-Media Pseudo-Relevance Feedback Approach to Image CLEF 2006 Photo Retrieval," In CLEF (2006).

J. Liu et al., "Dual Cross-Media Relevance Model for Image Annotation," MM'07, Augsburg, Bavaria, Germany (2007).

R. Lienhart et al., "Multilayer pLSA for multimodal image retrieval," In International Conference on Image and Video Retrieval, ACM (Apr. 2009).

Chang et al., "Approaches of Using a Word-Image Ontology and an Annotated Image Corpus as Intermedia for Cross-Language Image Retrieval," In CLEF 2006 Working Notes (2006).

Perronnin et al., "Fisher Kernels on Visual Vocabularies for Image Categorization," CVPR (2007).

Chum et al., "Total Recall: Automatic Query Expansion with a Generative Feature Model for Object Retrieval," IEEE 11th International Conference on Computer Vision, Oct. 2007.

* cited by examiner

RETRIEVAL SYSTEMS AND METHODS EMPLOYING PROBABILISTIC CROSS-MEDIA RELEVANCE FEEDBACK

BACKGROUND

The following relates to the retrieval system arts, multimedia document retrieval arts, object annotation arts, and so forth.

Retrieval systems enable selective retrieval of documents (e.g., text documents, images, audio files, video files, multimedia documents such as web pages or word processing documents including embedded images or other embedded non-text content, or so forth) from a database (for example, a dedicated database, or the Internet, or some other collection of documents). Retrieval systems can be useful as stand-alone systems, for example being employed by a user to retrieve documents of interest to the user, or can serve as component of another system. As an illustrative example of the latter, an automatic or semi-automatic image annotation system may employ a retrieval system to identify already-annotated images similar to a new (i.e., query) image, and the annotation system then annotates the new image based on the annotations of the identified similar already-annotated images.

Retrieval systems typically operate on a query basis, in which a query input to the retrieval system by a user or by an application program (e.g., the illustrative annotation system), and the query is compared with documents in the database in order to retrieve relevant documents. A well-known retrieval approach is keyword searching. Here, the documents include text and the query is a keyword or set of keywords, possibly having some logical relationship (e.g., "dog" AND "cat" requiring that a document include both words "dog" and "cat"). The retrieval system retrieves all documents that satisfy the keyword-based query (for example, that contain all the keywords). Keyword-based retrieval is relatively straightforward to implement, but has certain disadvantages, such as: retrieval of an unknown number of documents which can sometimes be prohibitively large; inability to operate on documents that do not contain text (or that do not contain text representing useful informational content); and a strong performance dependence on the user's selection of the keywords.

Other retrieval systems employ a similarity measure, and retrieve the documents found to be "most similar" to the query based on some similarity metric. An advantage of this approach is the number of retrieved documents can be constrained, for example by retrieving a "top-N" most similar documents. Similarity metric-based retrieval systems have other advantages including being less dependent on user selection of keywords, and being usable for documents of various types (not just text).

The query for similarity metric-based searching can be of various types. In an image retrieval system, for example, the user submits an image and the retrieval system compares the image with images in the database to retrieve similar images. In the text domain, the query can be a few words, or a sentence, or even a large document, and the similarity metric compares the text of the query with text of the documents in the database. Such similarity metric-based queries are sometimes called direct relevance queries, because they directly compare the query content with content of the database using a single content medium (e.g., comparison of query text with text of the database documents, or conversely comparison of query image with images of the database documents).

An expansion of direct relevance querying is pseudo-relevance querying. Pseudo-relevance generates a new query based on results retrieved in a first retrieval operation that directly uses the initial query, and then performs a second retrieval operation using the generated new query. For example, an initial text query may be used to retrieve a first set of documents from which text for a new, second query are extracted. The second query is then performed to generate the final results that are associated with the initial text query. Pseudo-relevance can be beneficial because the second query may contain "feedback" words related to, but not contained in, the initial text query, thus enriching the retrieval. For example, an initial text query of "dog breeds" may yield many documents including the word "canine" which was not in the initial query. The second query generated from the first-retrieved documents then includes the word "canine" and may thereby retrieve additional documents that use the related "canine" terminology, but not the "dog" terminology. These additional documents could not have been retrieved by direct operation of the initial query "dog breeds", even though they may be highly relevant to the initial "dog breeds" query.

Retrieval systems are also known which provide multimedia functionality. These systems retrieve documents that include content of more than one medium. A common example of a multimedia document is a document including both text and images, such as a magazine article, an Internet site having both text and images, or so forth. As another example, a multimedia document may be an Internet site having text, images, and video content (that is three media). One useful multimedia retrieval operation is to employ a query including information represented by two or more different media (e.g., both text and images) and to use the information of the different media in the retrieval. Another useful multimedia retrieval operation uses a query whose content is purely one media (e.g., a stand-alone image) to retrieve database documents based on content in a different media (e.g., text content). To accommodate such tasks, cross-media relevance querying can be employed.

Cross-media relevance, also referred to as trans-media relevance, operates similarly to pseudo-relevance, except that the media type is switched between the initial and second (feedback) query operations. In one example, an initial text query retrieves multimedia documents from which images are extracted and form a second, image query. Cross-media relevance provides similar query expanding benefits as does pseudo-relevance feedback; but, the query expanding capabilities of cross-media relevance extend across different media. For example, cross-media relevance can enable retrieval of a stand-alone image using a purely text query, or conversely may enable retrieval of a pure text document having no images using a stand-alone image query.

The following sets forth improved methods and apparatuses.

BRIEF DESCRIPTION

In some illustrative embodiments disclosed as illustrative examples herein, a method comprises optimizing weights of a document relevance scoring function to generate a trained document relevance scoring function, wherein: the document relevance scoring function comprises a weighted combination of scoring components including at least one of a pseudo-relevance scoring component and a cross-media relevance scoring component; and the optimizing is respective to a set of training documents including at least some multimedia training documents and a set of training queries and corresponding training document relevance annotations. A retrieval operation is performed for an input query respective to a database using the trained document relevance scoring function to retrieve one or more documents from the database. The optimizing and the performing are suitably performed by a digital processor.

In some illustrative embodiments disclosed as illustrative examples herein, a method as set forth in the immediately preceding paragraph is disclosed, wherein the optimizing comprises: for each training query of the set of training queries, computing training document relevance values for the training documents using the document relevance scoring function; and scaling the computed training document relevance values using training query-dependent scaling factors. Optionally, the optimizing also optimizes the training query-dependent scaling factors.

In some illustrative embodiments disclosed as illustrative examples herein, a method as set forth in any one of the immediately preceding two paragraphs is disclosed, wherein each pseudo-relevance scoring component or cross-media relevance scoring component comprises a weighted linear combination of an ordered list of top-k most similar feedback scoring sub-components weighted by a feedback ordinal position weighting, and the optimizing further comprises optimizing at least one parameter controlling the feedback ordinal position weighting.

In some illustrative embodiments disclosed as illustrative examples herein, a storage medium is disclosed storing instructions executable by a digital processor to perform a method as set forth in any one of the immediately preceding three paragraphs.

In some illustrative embodiments disclosed as illustrative examples herein, an apparatus comprises a digital processor configured to train a document relevance scoring function to generate a trained document relevance scoring function, wherein: the document relevance scoring function comprises a weighted linear combination of scoring components including at least one of a pseudo-relevance scoring component and a cross-media relevance scoring component; the training adjusts weights of the weighted linear combination of scoring components; and the training is respective to a set of training documents including at least some multimedia training documents and a set of training queries and corresponding training document relevance annotations.

In some illustrative embodiments disclosed as illustrative examples herein, an apparatus as set forth in the immediately preceding paragraph is disclosed, wherein the digital processor is configured to train the document relevance scoring function by a process including: for each training query of the set of training queries, computing training document relevance values for the training documents using the document relevance scoring function; and adjusting weights of the weighted linear combination of scoring components to optimize an objective function or classifier measuring an aggregate similarity between the computed training document relevance values and the corresponding training document relevance annotations.

DETAILED DESCRIPTION

Figure 1:
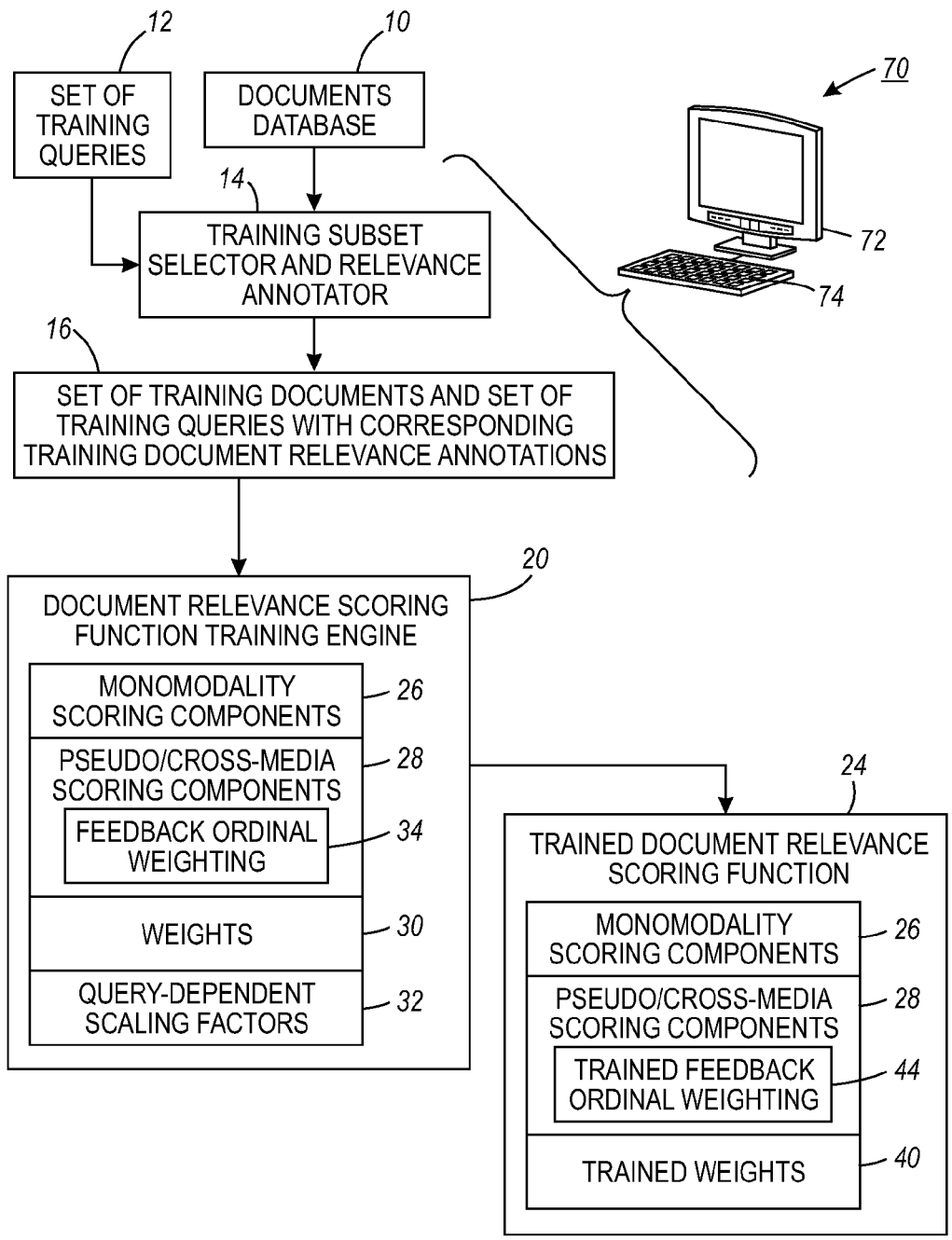
FIG. 1 diagrammatically shows an illustrative training system for generating an optimized score function for use in a retrieval system.

It is recognized herein that, although a wide diversity of similarity metrics are known, the selection of a suitable similarity metric for a given application is difficult using techniques existing heretofore. For example, considering a database including multimedia documents containing both text and image content, at least six different document relevance scoring metrics can be employed. These are summarized in Table 1.

In the rightmost column of Table 1, the following notation and symbols are used: q denotes the initial query, d and d' denote documents, and $s_x(a,b)$ denotes a similarity metric between a and b respective to the medium denoted by the subscript x. Thus, for example, $s_t(q,d)$ denotes a similarity metric between the initial query q and a document d respective to the textual (subscript t) medium, while $s_v(d',d)$ denotes a similarity metric between a document d' and a document d respective to the visual or image (subscript v) medium.

Any of the inputs q, d', and/or d may in general include textual medium content, visual (that is, image) medium content, or both textual and visual medium content. The query q may take various forms depending upon the application. For example, the query q may be input text, or an input image, or an input document (which may be pure text, pure image, or a multimedia document including text and image content). The documents d' and d may similarly comprise pure text, pure image, or multimedia text/image content. The term "document" as used herein does not connote any particular data representation or format for the text and/or image or combination thereof, although a specific implementation may employ a standard representation or format. Moreover, a given document may in general include one, two, three, or more different types of media. As another example, a document may include text, images, video, and audio (four media). A document including two or more different types of media of interest is referred to herein as a multimedia document or a multimodality document. (The terms "medium" and "modality" are used interchangeably herein).

In Table 1 the second column headed "Query modality" indicates the type of medium involved in the first retrieval operation, and does not require that the query comprise only that medium. Similarly, the third column headed "Feedback modality" indicates the type of medium involved in the second (query-expanding) retrieval operation, and again does not require that the intermediate document d' comprise only that medium. In the case of direct-relevance scoring metrics, there is no second, feedback modality. On the other hand, the pseudo-relevance and cross-media relevance scoring metrics are each composed of a sequence of monomodal similarity metrics, i.e. a first monomodal similarity metric (or, initial query) "followed by" a second monomodal similarity metric (or second, feedback query). In the rightmost column of Table 1, after the symbol "≡", a shorthand notation for the pseudo-relevance and cross-media relevance scoring metrics is given, of the form $s_{xy}(q,d)$ where the first subscript x denotes the initial query modality and the second subscript y denotes the second, feedback modality. For example, the cross-media relevance similarity metric in which the initial query operates on the text medium and the second query operates on the image medium is written as "$s_t(q,d')$ followed by $s_v(d',d)$", and the shorthand notation for this cross-media relevance similarity metric is $s_{tv}(q,d)$.

The pseudo-relevance similarity metrics and the cross-media relevance similarity metrics are each constructed of an ordered sequence of two monomodality (that is, direct relevance) similarity metrics. In the illustrative example, the available monomodality similarity metrics include: (1) the monomedium text similarity metric $s_t(-,-)$ and (2) the monomedium image or visual similarity metric $s_v(-,-)$ of the first two rows of Table 1 in the illustrative example. As another illustrative example, another possible monomedium similarity metric is an audio similarity metric which could be suitably denoted as $s_a(-,-)$ where subscript a represents the audio medium.

TABLE 1

| Relevance type | Query modality | Feedback modality | Scoring component for use in the illustrative weighted linear combination |
|---|---|---|---|
| Direct | Text | — | $s_t(q, d)$ |
| Direct | Image | — | $s_v(q, d)$ |
| Pseudo | Text | Text | $s_t(q, d')$ followed by $s_t(d', d) == s_{tt}(q, d)$ |
| Pseudo | Image | Image | $s_v(q, d')$ followed by $s_v(d', d) == s_{vv}(q, d)$ |
| Cross | Text | Image | $s_t(q, d')$ followed by $s_v(d', d) == s_{tv}(q, d)$ |
| Cross | Image | Text | $s_v(q, d')$ followed by $s_t(d', d) == s_{vt}(q, d)$ |

The monomodality similarity metrics may employ any suitable representation for the query q or document d or d', and may employ any suitable quantitative comparison between these representations. Illustrative comparisons suitably used for $s_v(-,-)$ and $s_t(-,-)$ are set forth next.

In an illustrative approach, Fisher vectors are used for the image representations. Fisher vectors used in this way are an extension of the bag-of-visual-words (BOV) representation. See, e.g. Perronnin et al., "Fisher Kernels on Visual Vocabularies for Image Categorization", IEEE Conference on Computer Vision and Pattern Recognition (CVPR 2007); and Perronnin, U.S. Pat. No. 7,680,341. In this approach, an image is characterized with the gradient vector derived from a Gaussian mixture model (GMM), which approximates the distribution of the low-level features extracted from images. If the dimension of the low level feature space is high (as is the case in the example embodiment) the dimension of these features are reduced using component analysis (PCA). In some suitable embodiments, 64 or 128 mixture components are employed, with two visual vocabularies combined (one defined over texture features, and the other over color features), in both of which the low level features are extracted on a regular grid at different scales. Using diagonal Gaussians and considering only the mean and variance parameters, the dimensionality of the Fisher Vector is hence 64 or 128*(50+50). The resulting two vectors are concatenated to obtain a single image signature of dimension 12800 or 25600. The similarity between two image feature vectors $f_d$ and $f_{d'}$ representing respective images d and d' is defined as their negative L1 distance: $s_v(d, d') = -\Sigma_k |f_d^k - f_{d'}^k|$. This is merely an illustrative example, and other monomodality visual similarity metrics $s_v(-,-)$ can be employed.

For the textual representation one suitable approach is the language modeling approach to information retrieval on the preprocessed texts. See, e.g. Ponte et al., "A language modelling approach to information retrieval", in ACM SIGIR, pp. 275-81 (1998). The preprocessing includes tokenization, lemmatization, word decompounding and a standard stop-word removal. In one suitable approach, to build the language model of the documents in the IAPR TC-12 dataset the title, the location and the description fields of the images to form a single document. The resulting language model defines for each document d a probability distribution p(w|d) over words w. In this framework a suitable similarity measure between two documents d and d' is suitably the cross-entropy: $s_t(d,d') = \Sigma_w p(w|d) \log p(w|d')$. Again, this is merely an illustrative example, and other monomodality text similarity metrics $s_t(-,-)$ can be employed.

As seen in Table 1, with only two types of media (text and image) there are already at least six possible document relevance scoring metrics. For three media the number of possible document relevance scoring metrics increases to at least twelve, e.g. if the three media are text (t), image/visual (v) and audio (a), then there are three possible direct-relevance scoring metrics: $s_t(q,d)$, $s_v(q,d)$, $s_a(q,d)$ plus three possible pseudo-relevance metrics (text/text, visual/visual, and audio/audio) plus six cross-media relevance metrics (text/visual, text/audio, visual/text, visual/audio, audio/text, and audio/visual). This multiplicity of possible scoring metrics has heretofore made it difficult to construct a suitable retrieval system with an appropriate scoring metric.

Disclosed herein are retrieval approaches that employ a document relevance scoring function (or metric) comprising a weighted combination of scoring components including at least one of a pseudo-relevance scoring component and a cross-media relevance scoring component, in which the weights of the weighted combination are optimized by training respective to a set of training documents including at least some multimedia training documents and a set of training queries and corresponding training document relevance annotations. In some illustrative embodiments, the weighted combination is a weighted linear combination. Optionally, the weighted combination may also include at least one direct-relevance scoring metric. In general, the scoring components of the weighted combination may include direct relevance scoring components, pseudo-relevance scoring components, and cross-media relevance scoring components. In some illustrative embodiments, the document relevance scoring function comprises a weighted linear combination of the six scoring components given in the rightmost column of Table 1.

In retrieval approaches disclosed herein, the weights of a document relevance scoring function (or metric) $f(q,d)$ comprising a weighted combination of scoring components are optimized to generate an optimized (or trained) document relevance scoring function (or metric) $f_{opt}(q,d)$, which is thereafter used in retrieval operations in order to assess the relevance of documents respective to the query. In the illustrative examples set forth herein, the document relevance scoring function is a weighted linear combination of scoring components suitably written in vector notation as $f(q,d) = w^T x_{qd} + \omega_o$. Here, $x_{qd}$ denotes the vector of scoring components, w denotes the vector of weights, the superscript T denotes the transpose operator, $\omega_o$ denotes a constant offset used for conditioning the mathematics, and the document relevance scoring function $f(q,d)$ indicates the relevance of the document d to the query q. In some illustrative examples, the vector of scoring components $x_{qd}$ has six scoring component elements as set forth in the rightmost column of Table 1.

Some suitable training processes for optimizing weights of a document relevance scoring function to generate a trained document relevance scoring function are described. As used herein, the term "optimize" (or "maximize", or "minimize", or other similar phraseology) does not necessarily denote determining an absolute optimal value or absolute optimal set of values, but rather denotes adjustment of values of the parameter or parameters (e.g., weights) in which the adjustment is guided by an objective function toward more optimal values. Thus, for example, an optimization of the weights of the document relevance scoring function may iteratively settle upon a locally optimal set of weight values rather than the global optimum, and this locally optimal set of weight values is considered the "optimized" set of weight values.

With reference to FIG. 1, a suitable training system is described for training the document relevance scoring function $f(q,d)$ comprising a weighted combination of scoring components to generate an optimized (or trained) document relevance scoring function $f_{opt}(q,d)$. The training system includes or has access to a documents database 10, and a set of training queries 12. A training subset selector and relevance annotator module 14 selects a set of training documents from the database 10 and, for each training document and for each training query of the set of training queries 12, assigns a training document relevance annotation. The result is a training set 16 including a set of training documents including at least some multimedia training documents and the set of training queries 12 and corresponding training document relevance annotations.

The training set 16 can be variously generated. In some embodiments, the documents database 10 is the documents collection from which the retrieval system retrieves documents. In such embodiments, the module 14 suitably selects a sub-set of documents from the documents database 10 as the set of training documents. On the other hand, in some embodiments the documents database 10 is a dedicated training database, and the module 14 suitably selects all of the documents in the documents database 10 as the set of training documents.

The training document relevance annotations can be assigned manually or by an automated or semiautomated annotation approach. In the illustrative embodiment, the training document relevance annotations are binary annotations: i.e., for each training document/training query pair the corresponding training document relevance annotation has one value if the training document is deemed to be relevant to the training query and another value if the training document is deemed not to be relevant to the training query. Alternatively, a graduated document relevance annotation scale can be employed (e.g., a training document relevance annotation in a continuous range [0,1] where 0 indicates complete irrelevance and 1 indicated maximal relevance).

With continuing reference to FIG. 1, a document relevance scoring function training engine 20 trains the document relevance scoring function 22 to generate an optimized (or trained) document relevance scoring function $f_{opt}(q,d)$ 24. In the illustrative embodiment, the document relevance scoring function 22 includes the six scoring components set forth in the rightmost column of Table 1, namely two direct-relevance scoring components 26 denoted as $s_t(q,d)$ and $s_v(q,d)$, and the four pseudo-/cross-media relevance scoring components 28 denoted (in the shorthand notation) as $s_{tt}(q,d)$, $s_{vv}(q,d)$, $s_{tv}(q,d)$, and $s_{vt}(q,d)$. These six scoring components 26, 28 form the vector elements of the vector of scoring components $x_{qd}$ which are weighted by the vector w of weights 30 to form the document relevance scoring function $f(q,d)=w^T x_{qd}+\omega_o$ 22. In some embodiments, the document relevance scoring function $f(q,d)$ used in the training includes query-dependent scaling factors 32 which are adjusted during the training as described herein. The training may also optionally employ a relevance ordinal position weighting 34 as described herein, and as a further option the relevance ordinal position weighting 34 may optionally be adjusted as part of the training. The training produces the trained document relevance scoring function 24 which includes the six scoring components 26, 28 forming the vector elements of the vector of scoring components $x_{qd}$, which are weighted by the vector $w_{opt}$ of optimized (or trained) weights 40 to form the optimized (or trained) document relevance scoring function $f_{opt}(q,d)=w_{opt}^T x_{qd}$ 24. Note that the offset $\omega_o$ is a constant for all query/document pairs (q,d) and hence may be omitted from the optimized document relevance scoring function $f(q,d)$ 24 that is used in retrieval operations. Additionally, the optional query-dependent scaling factors 32, if used during the training, are employed to ensure a query-invariant objective function and are also suitably omitted from the optimized document relevance scoring function $f(q,d)$ 24.

Having provided an overview of the training system and associated terminology with reference to FIG. 1, some illustrative embodiments of the training suitably performed using the system of FIG. 1 are set forth next. Further notation used in these illustrative embodiments is as follows. The set of training documents is denoted as D. For each training query q the corresponding training document relevance annotations are binary values identifying each document as either relevant or not relevant. The set of relevant documents thusly defined for the training query q is denoted as $R_q$ where $R_q \subset D$.

In some illustrative embodiments, the document relevance scoring function training engine 20 trains the document relevance scoring function 22 using a distribution-matching objective function. More particularly, the training (or optimizing) of the weights 30 is performed by optimizing a distribution matching objective function respective to matching between: (1) a distribution $p_q(d)$ of document relevance computed using the document relevance scoring function for the set of training queries and the set of training documents, and (2) a distribution $p_q^*(d)$ of the training document relevance annotations corresponding to the set of training queries. In the illustrative embodiment, the distribution $p_q(d)$ of document relevance computed using the document relevance scoring function is suitably given by:

$$p_q(d) = \frac{\exp(f(d,q))}{\sum_{d'=D} \exp(f(d',q))}, \quad (1)$$

and the distribution $p_q^*(d)$ of the training document relevance annotations corresponding to the set of training queries is given by:

$$p_q^*(d) = \begin{cases} |R_q|^{-1}: & d \in R_q \\ 0: & d \notin R_q. \end{cases} \quad (2)$$

The distribution $p_q^*(d)$ of Equation (2) is uniform over the relevant training documents belonging to $R_q$ and zero for all other training documents. The distribution-matching objective function can employ substantially any quantitative representation of the fractional overlap, distance between, or similarity between the two distributions $p_q(d)$ and $p_q^*(d)$. In an illustrative embodiment, the distribution-matching objective function is a Kullback-Leibler (KL) divergence $L_{DM}$ suitably written as:

$$L_{DM} = -\sum_q |R_q|^{-1} \sum_{d \in R_q} \log p_q(d) + \sum_q \log |R_q|. \quad (3)$$

The weights 30 of the document relevance scoring function $f(q,d)$ are adjusted to minimize the KL divergence $L_{DM}$ of Equation (3), and the scoring function providing the minimized KL divergence is the trained document relevance scoring function $f_{opt}(q,d)$. The KL divergence distribution-matching objective function $L_{DM}$ of Equation (3) is convex in the weight vector w, and the minimization of $L_{DM}$ can by way of illustrative example be performed using gradient descent. It will be noticed that the offset parameter $\omega_o$ cancels out in the objective function $L_{DM}$.

In some illustrative embodiments, the document relevance scoring function training engine 20 trains the document relevance scoring function 22 by training a classifier employing the document relevance scoring function 22 to predict document relevance for an input query. In these embodiments the training set 16 including a set of training documents and the set of training queries 12 and corresponding training document relevance annotations is used as the training set for training the classifier. In an illustrative example, the classifier is a binary classifier in which training query-training document pairs (q,d) are classified as relevant or not relevant. In the illustrative example, the binary class labels are $y_{qd} \in \{-1,+1\}$ where $y_{qd}=-1$ for a training document d that is not relevant to the query q and $y_{qd}=+1$ for a training document d that is relevant to the query q. The training document relevance annotations are thus readily written as binary class labels $y_{qd}$. The binary classifier generates class probabilities using the following logistic discriminant model: $p(y_{qd}=+1)=\sigma(f(q,d))$ where the function $\sigma(z)=(1+\exp(-z))^{-1}$. Again, the optimization (or training) can employ any suitable objective function comparing the output of the classifier with the reference class labels (suitably represented by whether the training document d is in the set of relevant training documents $R_q$). In an illustrative example, a log-likelihood of correct classification is maximized in order to determine the optimal weights $w_{opt}$, which is equivalent to minimizing the objective function:

$$L_{RC} = -\sum_q \left( \sum_{d \in R_q} \log p(y_{qd}=+1) + \sum_{d \notin R_q} \log p(y_{qd}=-1) \right). \quad (4)$$

Again, the objective function of Equation (4) is convex and can be minimized using gradient descent with respect to the weights w and offset $\omega_o$.

Learning a classifier to predict document relevance might not be optimal if the goal is to perform ranking on the score function. As another approach, a classifier employing the document relevance scoring function to predict the set $R_q$ of most relevant documents of the set of training documents for an input query is trained, again using the set of training documents and the set of training queries and corresponding training document relevance annotations. In one illustrative example, the document relevance score function is trained based on pair-wise comparisons with the objective being to ensure that each relevant document (that is, each document in the set of relevant training documents $R_q$) has a larger score than each not relevant document (that is, each document not in the set $R_q$). Toward this end, in another embodiment the classifier classifies document pairs each consisting of a relevant document $d \in R_q$ and a not relevant document $d' \notin R_q$. Using the relevance labels $y_{qd}$ and $y_{qd'}$ as before, the goal is to predict which of the two documents is the relevant document and which is the not relevant document. A suitable class probability is: $p(y_{qd} > y_{qd'}) = \sigma(f(d,q) - f(d',q))$. A suitable objective function is to maximize the log-probability of correct classification of all pairs for each document, that is to minimize the objective function:

$$L_{CC} = -\sum_q \sum_{d \in R_q} \sum_{d' \notin R_q} \log p(y_{qd} > y_{qd'}). \quad (5)$$

The objective function of Equation (5) is convex, and the offset $\omega_o$ cancels out, so that $L_{CC}$ may be suitably minimized using gradient descent on the weights w.

The various illustrative training examples set forth herein are merely illustrative examples, and other training approaches can be used.

In some instances substantial differences maybe encountered in the distribution of similarities for relevant and not relevant documents across different training queries of the set of training queries 12. The mean similarity to the query of the relevant document may differ significantly amongst the training queries, and/or the variance of these similarities may also differ significantly across the training queries. Such differences do not impact the use of the trained document relevance scoring function in performing retrieval operations, since it is invariant to changing the scoring function by applying an additive or a multiplicative constant. However, the objective function used in training the document relevance scoring function is typically not invariant for such transformations of the document relevance scoring function.

Accordingly, in some training embodiments, training document relevance values are computed for the training documents for each training query of the set of training queries 12 using the document relevance scoring function, and the computed training document relevance values are scaled using the training query dependent scaling factors 32 (see FIG. 1). In some embodiments, the optimizing of the document relevance scoring function includes optimizing the training query-dependent scaling factors 32. In some embodiments the training query-dependent scaling factors 32 include a linear scaling factor $\alpha_q$ for each training query q, and optionally the training query-dependent scaling factors may further include an offset scaling factor $\beta_q$ for each training query q.

In an illustrative example of using such query-dependent scaling factors to provide query-invariant objective functions, consider the relevance classification model set forth herein which employs the objective function $L_{RC}$ set forth in Equation (4). Suppose that there is a weighted linear combination with weights w of the different scoring components that would yield a score that perfectly ranks the documents. However, assume that for $q_1$ the relevant and not relevant documents can be separated by thresholding the score at $f(d,q_1)=5$, while for a different query $q_2$ the score threshold would be at $f(d,q_2)=10$. In this case where a perfect ranking is obtainable, this nonetheless does not translate into perfect performance of the classifier, and hence an optimal estimation of the weights w, since the score function $f(q,d)=w^T x_{qd} + \omega_o$ has a unique bias term in the offset $\omega_o$. To render the objective functions used in the training invariant to additive and multiplicative constants per query, the document relevance score function is suitably redefined as: $f(q,d) = \alpha_q w^T x_{qd} + \beta_q$, where the linear scaling factor $\alpha_q$ and the offset scaling factor $\beta_q$ are the query-dependent scaling factors for the query q.

When using the document relevance score function $f(q,d) = \alpha_q w^T x_{qd} + \beta_q$ having the query-dependent scaling factors $\alpha_q$ and $\beta_q$, the optimizing of the objective functions is as already described, except that the optimized parameters include both the weights 30 (that is, the weights vector w) and the query-dependent scaling factors 32 (that is, the auxiliary parameters $\{\alpha_q, \beta_q\}$. Since the document relevance score function with query-dependent scaling factors is bi-linear in the parameters, a suitable optimization process operates it in alternation over the weights w and the linear scaling factors $\alpha_q$, which is a convex problem in both cases. The offset scaling factors $\beta_q$ are optimized jointly with both the weights w and the linear scaling factors $\alpha_q$. However, in an objective function such as $L_{DM}$ of Equation (2) or $L_{CC}$ of Equation (5), in which the offset $\omega_o$ out, it follows that the offset scaling factors $\beta_q$ are suitably omitted (while the linear scaling factors $\alpha_q$ are retained to provide query-invariant objective functions in these cases).

With reference back to Table 1, each pseudo-relevance scoring component and each cross-media relevance scoring component is suitably represented by the shorthand form $s_{xy}(q,d)$, and comprises a first query $s_x(q,d')$ yielding a set of feedback documents d' that are then used in a second, feedback query $s_y(d',d)$. To be computationally tractable, the set of feedback documents d' should be finite. In some embodiments, the "top-k" feedback documents are retained, that is, $d' \in N_q^k$ where $N_q^k$ is the top-k set of most similar documents returned by the query $s_x(q,d')$. This set of top-k most similar documents can be considered as an ordered list of the top-k most similar documents $d_1, d_2, \ldots, d_k \in N_q^k$ where $d_1$ has the highest similarity to q as measured by the metric $s_x(q,d_1)$, $d_2$ has the next highest similarity to q as measured by the metric $s_x(q,d_2)$, and so forth. For a given query/document pair $(q,d)$, the quantitative score for the pseudo- or cross-media relevance scoring component $s_{xy}(q,d)$ depends on the metric chosen for quantifying "similarity" between the query q and the document d. One suitable metric for the value of the pseudo- or cross-media relevance scoring component $s_{xy}(q,d)$ is:

$$s_{xy}(q,d) = \sum_{i=1}^{k} s_x(q,d_i) s_y(d_i,d). \quad (6)$$

This metric is a linear combination of an ordered list of top-k most similar feedback scoring sub-components, where each feedback scoring sub-component is of the form $s_x(q,d_i) s_y(d_i,d)$ where $d_i \in N_q^k$ corresponds to one of the top-k feedback documents $d_1, d_2, \ldots, d_k \in N_q^k$. In the metric of Equation (6), each scoring sub-component has the same weight, that is, contributes identically to the linear combination, and so the similarity ordering of the feedback documents $d_1, d_2, \ldots, d_k \in N_q^k$ is of no consequence.

In other contemplated embodiments, the metric is a weighted linear combination of the ordered list of top-k most similar feedback scoring sub-components, weighted by a feedback ordinal position weighting. This corresponds to modifying the metric of Equation (6) as follows:

$$s_{xy}(q,d) = \sum_{i=1}^{k} \gamma_i s_x(q,d_i) s_y(d_i,d), \quad (7)$$

where the coefficients $\gamma_i$ are the weights of the linear combination, and in general it is expected that $\gamma_1 \geq \gamma_2 \geq \ldots \geq \gamma_k$ so as to provide relatively higher weight for those feedback documents that are more similar to the initial query q as measured by the similarity metric $s_x(q,d_i)$. In the context of FIG. 1, these coefficients $\gamma_i$ are the feedback ordinal position weighting 34. In some embodiments, these coefficients $\gamma_i$ are also trained during the training of the document relevance scoring function $f(q,d)$ 22. Since a positive relation between the neighbor similarities and the final similarity is expected, a non-negativity constraint can be imposed on the coefficients $\gamma_i$ of the linear combination of Equation (7). This, together with the ordering constraint $\gamma_1 \geq \gamma_2 \geq \ldots \geq \gamma_k$ defines a convex feasible set.

The approach of Equation (7) creates k new parameters $\gamma_1, \gamma_2, \ldots, \gamma_k$ for the optimization. In an alternative embodiment, a functional relationship is used to replace these k parameters with a single parameter $\gamma$. One approach which satisfies non-negativity and ordering constraints is to employ the softmax function to replace the k coefficients $\gamma_1, \gamma_2, \ldots, \gamma_k$ as follows:

$$s_{xy}(q,d) = \sum_{i=1}^{k} \tilde{s}_x(q,d_i) s_y(d_i,d), \quad (8)$$

where $$\tilde{s}_x(q,d_i) = \frac{\exp(\gamma s_x(d_i,q))}{\sum_{d' \in N_q^k} \exp(\gamma s_x(d',q))}. \quad (9)$$

This latter approach has the advantage of adding only a single parameter $\gamma$ to the training process, as opposed to adding k parameters in the case of the approach of Equation (7). Furthermore, the approach of Equations (8) and (9) ensures that the weights of the weighted linear combination of the ordered list of top-k most similar feedback scoring sub-components vary smoothly with the similarity ordinal index 1, 2, ..., k. Consider for example two documents $d_n, d_m \in N_q^k$ that almost have the same similarity to the query q (that is, $s_x(q,d_n) = s_x(q,d_m) + \epsilon$ with small $\epsilon$). For this example the rank-based weights can change drastically depending on the sign of $\epsilon$, whereas the weights according to Equations (8) and (9) will change by a small and controllable amount.

With continuing reference to FIG. 1, optimization of the feedback ordinal weighting 34 of the pseudo-/cross-media relevance scoring components using the approach of Equation (7), the parameters estimation is not otherwise affected. Since the similarity $s_{xy}(q,d)$ is linear in the parameters $\gamma_i$ and the products $s_x(q,d') s_y(d',d)$, it is sufficient to add the latter as additional dimensions in the vector $x_{qd}$ and the added $\gamma_i$ parameters will be additional elements in the weights vector w. The weighted linear combination of the top-k feedback documents $d_1, d_2, \ldots, d_k \in N_q^k$ can thus be learned while also combining them with other single-modal or multi-modal similarity measures. When using the weighting of Equations (8) and (9), optimization can be performed over the single parameter $\gamma$ in an alternating manner as already described for the weights vector w and the linear query-dependent scaling factors $\alpha_q$. In either case, a resulting trained feedback ordinal weighting 44 is part of the trained document relevance scoring function 24, insofar the trained feedback ordinal weighting 44 is used in computing values for the pseudo/cross-media relevance scoring components 28.

Figure 2:
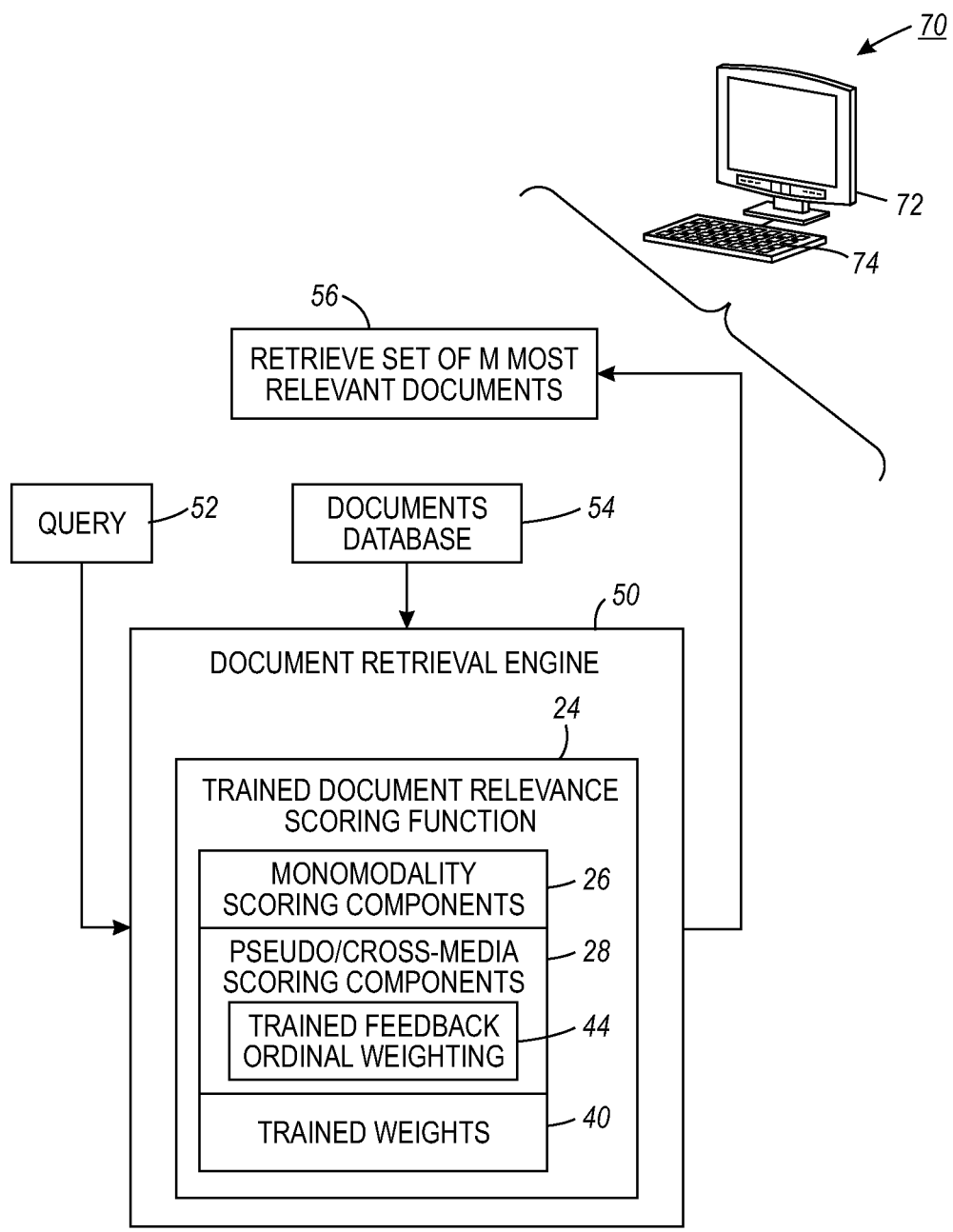
FIG. 2 diagrammatically shows an illustrative retrieval system using an optimized score function generated by the training system of FIG. 1.
Figure 3:
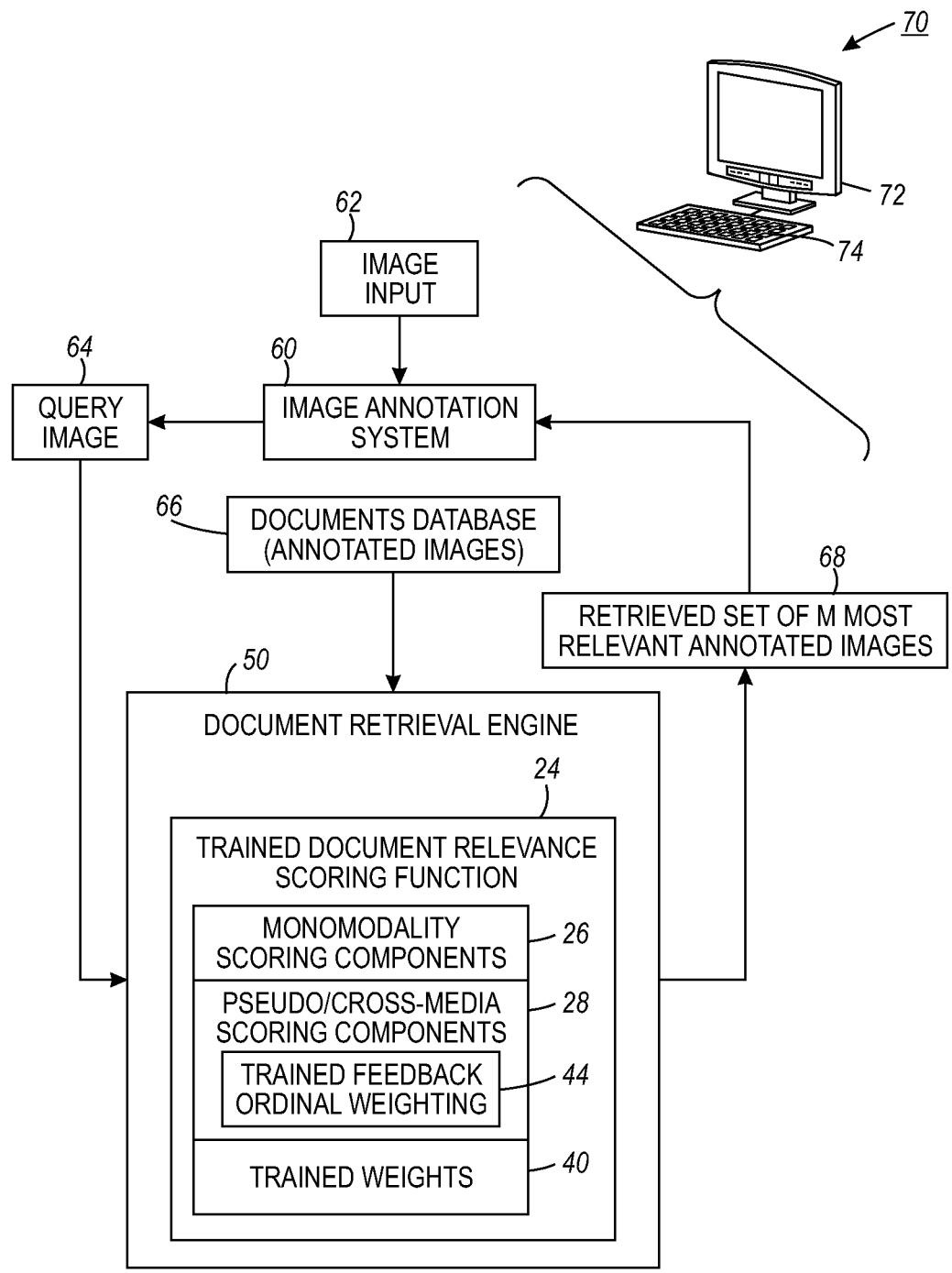
FIG. 3 diagrammatically shows an illustrative image annotation system employing a retrieval system using an optimized score function generated by the training system of FIG. 1.

With reference to FIGS. 2 and 3, the trained document relevance scoring function 24 is suitably used for retrieval operations. FIG. 2 diagrammatically illustrates a retrieval system 50 operating in a "stand-alone" mode in which the retrieval system 50 is directly accessed by a user as the primary application. A user inputs a query 52, for example by requesting documents similar to a query document (which may be a monomodal document or a multimodal document), and the retrieval system 50 employs the trained document relevance scoring function 24 to compare documents of a documents database 54 (which may, in general, be the same as or different from the documents database 10 from which the training documents were obtained) with the query 52 in order to identify a set of M most relevant documents 56 that are returned by the retrieval system 50 responsive to the query 52.

FIG. 3 depicts the retrieval system 50 used as a component of an image annotation system 60. An input image 62 is input to the image annotation system 60 for annotation. The image annotation system 60 generates a query image 64, which may be identical with the input image 62 or may have some reformatting (e.g., adjusted resolution, conversion to grayscale, or so forth). The query image 64 is input to the retrieval system 50 which employs the trained document relevance scoring function 24 to compare the query image 64 with annotated images stored in a documents database 66 containing annotated images to identify a set M of most relevant annotated images 68. Advantageously, the cross-media relevance scoring component $s_{vt}(q,d)$ enables utilization of the annotations in the scoring function 24. The set M of most relevant annotated images 68 are returned to the image annotation system 60 responsive to the query 64, and the annotations of these images are used by the image annotation system 60 to generate annotations for the input image 62.

With reference to FIGS. 1-3, the training system (FIG. 1) and the two illustrative application systems (FIGS. 2 and 3) are suitably embodied as a digital processor (for example, an illustrative computer 70) running suitable software or firmware to implement or embody the disclosed processing components 14, 20, 50, 60. An illustrative display 72 can be used to display the retrieved documents 56, or the image annotations generated by the image annotation system 60, or other output. An illustrative keyboard 74 (or a mouse, trackpad, or other user input device) suitably enables user input to generate or select the query 52, input image 62, or so forth, and to enable optional manual selection of training documents and/or manual training document relevance annotation input via the selector/annotator 14. Instead of the illustrative computer 70, the digital processor can be embodied by another device employing a microprocessor, microcontroller, or other digital processor, such as a personal data assistant (PDA) (which may suitably employ the retrieval system of FIG. 2, by way of illustrative example, with the database 54 being the Internet), or a digital camera (which may suitably employ the image annotation system of FIG. 3, by way of illustrative example, with the database 66 being images stored on the camera and/or stored in an external photograph archive with which the digital camera has access), or so forth. The training system (e.g., FIG. 1) may be embodied by the same digital processor that embodies the application system (e.g., FIG. 2 or FIG. 3). Alternatively, the training system (e.g., FIG. 1) may be embodied by a different digital processor than the digital processor embodying the application system (e.g., FIG. 2 or FIG. 3). In the latter case, the trained document relevance scoring function 24 is suitably communicated from the training system to the application system for use by the retrieval engine 50.

In other embodiments, the training system (FIG. 1) and the two illustrative application systems (FIGS. 2 and 3) are suitably embodied as a storage medium storing instructions executable by a digital processor (such as the illustrative computer 70) to implement the disclosed processing components 14, 20, 50, 60. The storage medium may, for example, be a hard disk drive or other magnetic storage medium, an optical disk or other optical storage medium, random access memory (RAM), read only memory (ROM), or another electronic storage medium, various combinations thereof, or so forth.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A non-transitory storage medium storing instructions executable by a digital processor to perform a method comprising:
optimizing weights of a document relevance scoring function to generate a trained document relevance scoring function $f(q,d)$ where q denotes a query and d denotes a document, wherein the document relevance scoring function comprises a weighted combination of scoring components including at least one pseudo-relevance scoring component and at least one cross-media relevance scoring component, and the optimizing is respective to a set of training documents including at least some multimedia training documents and a set of training queries and corresponding training document relevance annotations, the optimizing comprising optimizing a distribution-matchinq objective function respective to matching between:
a distribution $$p_q(d) = \frac{\exp(f(d,q))}{\sum_{d' \in D} \exp(f(d',q))}$$

of document relevance computed using the document relevance scoring function $f(q,d)$ for the set of training queries and the set of training documents D, and
a distribution $$p_q^*(d) = \begin{cases} |R_q|^{-1} & : d \in R_q \\ 0 & : d \notin R_q \end{cases}$$

of the training document relevance annotations corresponding to the set of training queries where $R_q$ is the set of documents relevant to training query q; and
performing a retrieval operation for an input query respective to a database using the trained document relevance scoring function to retrieve one or more documents from the database.

2. The non-transitory storage medium as set forth in claim 1, wherein the document relevance scoring function $f(q,d)$ comprises a weighted linear combination of scoring components including at least one pseudo-relevance scoring component, at least one cross-media relevance scoring component, and at least one direct relevance scoring component.

3. The non-transitory storage medium as set forth in claim 1, wherein:
the at least one pseudo-relevance scoring component of the document relevance scoring function $f(q,d)$ includes at least one of a pseudo-relevance textual scoring component and a pseudo-relevance image scoring component; and
the at least one cross-media relevance scoring component of the document relevance scoring function $f(q,d)$ includes at least one of a cross-media relevance scoring component having a text query modality and an image feedback modality and a cross-media relevance scoring component having an image query modality and a text feedback modality.

4. The method non-transitory storage medium as set forth in claim 1, wherein the optimizing comprises:
training a classifier employing the document relevance scoring function $f(q,d)$ to predict document relevance for an input query, the training using the set of training documents and the set of training queries and corresponding training document relevance annotations.

5. The non-transitory storage medium as set forth in claim 1, wherein the optimizing comprises:
    training a classifier employing the document relevance scoring function $f(q,d)$ to predict a set of most relevant documents of the set of training documents for an input query, the training using the set of training documents and the set of training queries and corresponding training document relevance annotations.

6. The non-transitory storage medium as set forth in claim 1, wherein the optimizing comprises:
    for each training query of the set of training queries, computing training document relevance values for the training documents using the document relevance scoring function $f(q,d)$; and
    scaling the computed training document relevance values using training query-dependent scaling factors.

7. A method comprising:
    optimizing weights of a document relevance scoring function to generate a trained document relevance scoring function $f(q,d)$ where q denotes a query and d denotes a document, wherein the document relevance scoring function comprises a weighted combination of scoring components including at least one pseudo-relevance scoring component and at least one cross-media relevance scoring component, and the optimizing is respective to a set of training documents including at least some multimedia training documents and a set of training queries and corresponding training document relevance annotations, the optimizing including optimizing a distribution-matching objective function respective to matching between:
        a distribution $p_q(d)$ of document relevance computed using the document relevance scoring function $f(q,d)$ for the set of training queries and the set of training documents D, and
    a distribution $p_q^*(d)$ of the training document relevance annotations corresponding to the set of training queries wherein $p_q^*(d)$ is uniform over a set of documents $R_q$ that are relevant to training query q and zero for all other training documents, the optimizing further including:
        for each training query of the set of training queries, computing training document relevance values for the training documents using the document relevance scoring function $f(q,d)$; and
        scaling the computed training document relevance values using training query-dependent scaling factors, wherein the optimizing also optimizes the training query-dependent scaling factors; and
    performing a retrieval operation for an input query respective to a database using the trained document relevance scoring function to retrieve one or more documents from the database;
    wherein the optimizing and the performing are performed by a digital processor.

8. The non-transitory storage medium as set forth in claim 6, wherein the training query-dependent scaling factors include a linear scaling factor $\alpha_q$ for each training query.

9. The non-transitory storage medium as set forth in claim 8, wherein the training query-dependent scaling factors further include an offset scaling factor $\beta_q$ for each training query.

10. The non-transitory storage medium as set forth in claim 6, wherein the trained document relevance scoring function does not include the training query-dependent scaling factors.

11. The non-transitory storage medium as set forth in claim 6, wherein each of the at least one pseudo-relevance scoring component and at least one cross-media relevance scoring component comprises a weighted linear combination of an ordered list of top k most similar feedback scoring sub-components weighted by a feedback ordinal position weighting, and the optimizing further comprises:
    optimizing at least one parameter controlling the feedback ordinal position weighting.

12. The non-transitory storage medium as set forth in claim 1, wherein each of the at least one pseudo-relevance scoring component and at least one cross-media relevance scoring component comprises a weighted linear combination of an ordered list of top k most similar feedback scoring sub-components weighted by a feedback ordinal position weighting, and the optimizing further comprises:
    optimizing at least one parameter controlling the feedback ordinal position weighting.

13. The non-transitory storage medium as set forth in claim 1, wherein the document relevance scoring function $f(q,d)$ comprises a weighted linear combination of scoring components including at least one pseudo-relevance scoring component and at least one cross-media relevance scoring component.

14. The non-transitory storage medium as set forth in claim 1, wherein the database includes annotated images, the retrieval operation is performed for an input query image and the method further comprises:
    constructing an annotation for the input query image based on annotations of annotated images retrieved from the database by the retrieval operation.

15. An apparatus comprising:
    a digital processor configured to train a document relevance scoring function to generate a trained document relevance scoring function $f(q,d)$ where q denotes a query and d denotes a document, wherein the document relevance scoring function comprises a weighted linear combination of scoring components including at least one pseudo-relevance scoring component and at least one cross-media relevance scoring component, the training adjusts weights of the weighted linear combination of scoring components, and the training is respective to a set of training documents including at least some multimedia training documents and a set of training queries and corresponding training document relevance annotations, wherein the digital processor is configured to train the document relevance scoring function by a process including:
        for each training query of the set of training queries, computing training document relevance values for the training documents using the document relevance scoring function $f(q,d)$;
        scaling the computed training document relevance values using training query-dependent scaling factors; and
        adjusting (i) weights of the weighted linear combination of scoring components and (ii) the training query-dependent scaling factors to optimize a distribution-matching objective function measuring an aggregate similarity between the computed training document relevance values and the corresponding training document relevance annotations, wherein the distribution-matching objective function is respective to matching between (1) a distribution $p_q(d)$ of document relevance computed using the document relevance scoring function $f(q,d)$ for the set of training queries and the set of training documents D, and (2) a distribution $p_q^*(d)$ of the training document relevance annotations corresponding to the set of training queries wherein $p_q^*(d)$ is uniform over a set of documents $R_q$ that are relevant to training query q and zero for all other training documents.

16. The apparatus as set forth in claim 15, wherein:
the at least one pseudo-relevance scoring component of the document relevance scoring function includes at least one of a pseudo-relevance textual scoring component and a pseudo-relevance image scoring component;
the at least one cross-media relevance scoring component of the document relevance scoring function includes at least one of a cross-media relevance scoring component having a text query modality and an image feedback modality and a cross-media relevance scoring component having an image query modality and a text feedback modality; and
the linear combination of scoring components further includes at least one of a direct relevance text scoring component and a direct relevance image scoring component.

17. The apparatus as set forth in claim 15, wherein the training query-dependent scaling factors include a linear scaling factor for each training query of the set of training queries.

18. The apparatus as set forth in claim 15, wherein trained document relevance scoring function does not include the training query-dependent scaling factors, and the digital processor is further configured to perform a retrieval operation using the trained document relevance scoring function.

19. The method as set forth in claim 7, wherein the training query-dependent scaling factors include a linear scaling factor $\alpha_q$ for each training query.

20. The method as set forth in claim 19, wherein the training query-dependent scaling factors further include an offset scaling factor $\beta_q$ for each training query.

21. The method as set forth in claim 7, wherein the trained document relevance scoring function does not include the training query-dependent scaling factors.

22. The method as set forth in claim 7, wherein each of the at least one pseudo-relevance scoring component and at least one cross-media relevance scoring component comprises a weighted linear combination of an ordered list of top k most similar feedback scoring sub-components weighted by a feedback ordinal position weighting, and the optimizing further comprises:
optimizing at least one parameter controlling the feedback ordinal position weighting.

* * * * *